United States Patent [19]

Moren

[11] Patent Number: 4,933,373
[45] Date of Patent: Jun. 12, 1990

[54] ABRASIVE WHEELS
[75] Inventor: Louis S. Moren, White Bear Lake, Minn.
[73] Assignee: Minnesota Mining and Manufacturing Company, St. Paul, Minn.
[21] Appl. No.: 333,036
[22] Filed: Apr. 6, 1989
[51] Int. Cl.$^5$ .............................................. C08G 18/14
[52] U.S. Cl. ..................................... 521/99; 521/170; 528/50; 528/75
[58] Field of Search .................... 521/99, 170; 528/50, 528/75

[56] References Cited

U.S. PATENT DOCUMENTS

| | | | |
|---|---|---|---|
| 2,972,527 | 2/1961 | Upton, Jr. ............................. | 51/298 |
| 3,252,775 | 5/1966 | Tocci-Guilbert ...................... | 51/296 |
| 3,377,411 | 4/1968 | Charvat ................................ | 264/45 |
| 3,607,976 | 9/1971 | Malsh et al. ......................... | 260/859 |
| 3,674,743 | 7/1972 | Verdol et al. ....................... | 260/73 L |
| 3,678,014 | 7/1972 | Suzuki et al. ....................... | 260/77.5 |
| 3,850,589 | 11/1974 | Charvat ................................ | 51/296 |
| 3,987,012 | 10/1976 | Statton ................................ | 260/77.5 |
| 4,049,396 | 9/1977 | Hiles .................................... | 51/295 |
| 4,104,265 | 8/1978 | deZaraux ............................. | 528/46 |
| 4,225,683 | 9/1980 | Timm et al. ......................... | 525/126 |
| 4,255,552 | 3/1981 | Schollenberger et al. ........... | 528/50 |
| 4,343,339 | 8/1982 | Schwindt et al. .................... | 152/209 R |
| 4,459,779 | 7/1984 | Shen ..................................... | 51/296 |
| 4,609,380 | 9/1986 | Barnett et al. ....................... | 51/298 |
| 4,613,345 | 9/1986 | Thicke et al. ........................ | 51/293 |

Primary Examiner—Maurice J. Welsh
Attorney, Agent, or Firm—Donald M. Sell; Walter N. Kirn; Richard Francis

[57] ABSTRACT

A molded abrasive article comprising abrasive particles dispersed throughout and adhered within a crosslinked polyurethane binder matrix having a glass transition temperature greater than about 10° C. and a glass transition temperature range of greater than about 70° C.

21 Claims, No Drawings

ABRASIVE WHEELS

TECHNICAL FIELD

The present invention relates to molded abrasive articles comprising abrasive particles dispersed throughout and adhered within a binder matrix. More particularly, it relates to molded abrasive articles comprising abrasive particles dispersed throughout and adhered within a crosslinked polyurethane binder matrix having a glass transition temperature greater than about 10° C. and a glass transition temperature range greater than about 70° C.

BACKGROUND OF THE INVENTION

Abrasive products formed of a solid or foamed organic polymeric matrix having abrasive granules dispersed throughout and bonded therein are well known and widely used. Typically, the polymeric matrix is composed of either a hard thermoset resin, such as base catalyzed phenol formaldehyde, or a resilient elastomeric resin, such as a polyurethane.

The hard thermosetting resins generally have a high tensile strength and a low elongation at failure, and produce bonded abrasive products which are resistant to significant change when subject to elevated temperatures. However, these hard thermoset resin bonded abrasive products are susceptible to brittle fracture and have the disadvantage of leaving "chatter" marks on the workpiece, particularly when used in off-hand operations.

The elastomeric resins generally produce an abrasive product having some degree of flexibility and resiliency. Typically, these articles provide a smoother abrasive action and a finer surface finish than a hard thermoset resin bonded article. Because of this, flexible elastomeric resin bonded abrasive articles have found a broad range of industrial applications such as in the metal-working and wood-working industries for deburring, finishing and sanding. Unfortunately, however, these elastomeric resin bonded articles often show significant softening at elevated temperatures as might be encountered when an abrasive product is urged against a workpiece at high surface speeds and/or high pressures. Such softening often results in the premature loss of abrasive particles, the undesirable smearing or transfer of portions of the abrasive article to the surface of the workpiece in the case of metal-working applications, or the glazing over of the article's surface in the case of wood-working applications.

Conventional elastomeric resin bonded abrasive articles typically use an elastomeric polyurethane as the binder matrix. The polyurethane binder matrix may be a foam as disclosed in U.S. Pat. Nos. 4,613,345, 4,459,779, 2,972,527, 3,850,589 and U.K. Patent Specification No. 1,245,373, published Sept. 8, 1971, or the polyurethane binder may be solid as disclosed in U.S. Pat. Nos. 3,982,359, 4,049,396 and 4,221,572. Furthermore, the polyurethane binder matrix may be formed of a linear or crosslinked polymer network.

Linear or lightly crosslinked polyurethane networks tend to be more flexible and resilient but have a greater propensity for smearing or glazing. Highly crosslinked polyurethane networks have a reduced propensity for smearing or glazing but typically are too hard and brittle to be useful as a binder for flexible abrasive products. Furthermore, conventional attempts to form a resilient yet smear-resistant binder by introducing a moderate amount of crosslinking into the polyurethane network with standard crosslinking techniques using polyfunctional isocyanates and polyfunctional polyols have proven unsuccessful. Due to the extended distances between crosslinks, the amount of crosslinking necessary to provide smear-resistance by these standard crosslinking techniques typically makes the resin hard and brittle.

An unmet need thus exists for a flexible molded abrasive article that will not smear or glaze when used at high surface speeds and/or high operating pressures.

SUMMARY OF THE INVENTION

The present invention provides a shatter-resistant, flexible and resilient, molded abrasive article which conforms to the surface of the workpiece during use so as to produce a finish essentially free of chatter marks, even when used in off-hand operations. In addition, the abrasive article is smear resistant and can be urged against a workpiece at high operating speeds and/or pressures without smearing or glazing.

The ability of a molded abrasive article such as the abrasive article of the invention to be operated at high speeds and/or high pressures without glazing or smearing is thought to be related to the glass transition temperature of the binder material and the temperature range over which the complete glass transition occurs (hereinafter referred to as the glass transition temperature range). To be useful in high speed and/or pressure operations without undesirable glazing or smearing, it has been discovered that the binder material must have a glass transition temperature greater than about 10° C. and a glass transition temperature range greater than about 70° C.

The molded abrasive article of the invention is formed of abrasive particles dispersed throughout and adhered within a tough, smear-resistant, elastomeric, crosslinked polyurethane binder matrix. The binder matrix comprises the cured polymerization reaction product of a polymerizable mixture comprising: (a) short-chain, active hydrogen functional monomer having an average active hydrogen functionality of from about 2 to 8 and an average molecular weight less than about 400; (b) long-chain, active hydrogen functional, diene prepolymer having an average active hydrogen functionality of from about 2 to 4 and an average molecular weight of from about 400 to 25,000; (c) polyisocyanate having an average isocyanate functionality of from about 2 to 4; and (d) crosslinking initiator which induces crosslinking between unsaturation sites on adjacent diene prepolymer residues. The components of the mixture are present in such relative quantities as are necessary to provide the binder matrix with a glass transition temperature greater than about 10° C. and a glass transition temperature range of greater than about 70° C.

The molded abrasive articles of the invention, when fabricated into wheels, display higher rates of cut and lower rates of abrasive wheel loss than conventional elastomer bonded abrasive wheels. Furthermore, these wheels can be urged against the workpiece at higher pressures and/or higher surface speeds, without undesirable glazing of the article's surface or smearing of the abrasive article on the surface of the workpiece, than is typically possible with conventional elastomer bonded abrasive wheels. This superior performance is believed attributable to the novel elastomeric polyurethane binder matrix.

The novel binder matrix is formed of a crosslinked polyurethane network comprised of hard rigid segments, derived from the short-chain monomer units, and soft flexible segments, derived from the long-chain prepolymer units, wherein adjacent soft segments are crosslinked. It is this unique combination of hard segments and crosslinked soft segments which provide a flexible and resilient binder matrix having a glass transition temperature greater than about 10° C. and a glass transition temperature range of greater than about 70° C.

The binder matrix of the abrasive articles of the invention may be solid or foamed. Foamed articles are prepared by the inclusion of a foaming agent in the polymerizable mixture which cures to form the binder matrix.

Abrasive wheels made according to the invention can be used in both metal and wood stock removal operations. Typically, the foamed abrasive articles are more resilient and will be of greater utility in wood-working applications and the solid abrasive articles will have greater utility in metal-working applications. However, it should be understood that both the solid and foamed articles may find utility in refining both wood and metal surfaces.

DETAILED DESCRIPTION OF THE INVENTION

The abrasive articles of the present invention may take any of a variety of conventional forms. The preferred articles are in the form of wheels. Such wheels are typically in the form of a disc or right cylinder having dimensions which may be very small, e.g., a cylinder height on the order of one centimeter, or very large, e.g., two meters or more, and a diameter which may be very small, e.g., on the order of a few centimeters, or very large, e.g., one meter or more. The wheels typically have a central opening for support by an appropriate arbor or other mechanical holding means to enable the wheel to be rotated in use. Wheel dimensions, configurations, means of support, and means of rotation are all well known in the art.

The abrasive wheels of the invention may be prepared by the following steps: (a) preparing a solvent-free, liquid, polymerizable mixture comprising short-chain, active hydrogen functional monomer; long-chain, active hydrogen functional diene prepolymer; polyisocyanate; and crosslinking initiator in such relative amounts as necessary to provide, upon curing, a polymer having a glass transition temperature greater than about 10° C. and a glass transition temperature range greater than about 70° C., (b) dispersing particles of abrasive material throughout this liquid polymerizable mixture, (c) pouring this abrasive particle/liquid polymerizable mixture slurry into a wheel-shaped mold, and (d) curing the polymerizable mixture.

The short-chain, active hydrogen functional monomers useful in the present invention should have an average active hydrogen functionality of from about 2 to 8, preferably from about 2 to 4, and more preferably from about 2 to 3, and an average molecular weight less than about 400, preferably less than 200. As used herein, "active hydrogen functionality" refers to the number of hydroxy, amine, carboxyl and thiol groups present in the molecule. The short-chain monomers may be aliphatic or aromatic. Suitable examples include trimethylolpropane monoallyl ether, ethanolamine, diethanolamine, methylene dianiline, diethyltoluene diamine, 2-methylpentamethylenediamine, paraphenylenediamine, ethylene glycol, propylene glycol (1,2 and 1,3), butylene glycol (1,4 and 2,3), 1,4 butenediol, 1,4 butanediol, various hydroxy substitutions of pentanediol, hexanediol and octanediol, trimethylolpropane and mixtures thereof.

The most preferred short-chain monomers have an average active hydrogen functionality of 2 as these do not provide additional crosslinking in the resultant polyurethane network and, therefore, do not reduce the resiliency of the binder. Of these difunctional monomers, the diols are preferred with 1,4 butanediol, in particular, being especially preferred.

When a more highly crosslinked and less resilient wheel is desired, short-chain monomers having an average active hydrogen functionality greater than two, such as triols or higher functional polyols, may be present in the short-chain monomer component. However, when these triols or higher functional polyols provide more than about 5 percent of the active hydrogen functional sites in the polymerizable mixture, the resultant abrasive wheels display a decrease in abrading efficiency (defined as cut/wear). It is, therefore, generally preferred that no more than about five percent of the total active hydrogen functional sites in the polymerizable mixture be provided by short-chain monomers having an average active hydrogen functionality greater than two.

Furthermore, it may be desirable to include short-chain diamines in the short-chain monomer component in order to introduce urea structure into the polyurethane network. Although in such cases the resulting polymer is more aptly described as a polyurea urethane, for simplicity the term polyurethane, as used herein, is intended to include both true polyurethanes and polyurea urethanes.

The long-chain, active hydrogen functional, diene prepolymer should have an average active hydrogen functionality of from about 2 to 4 and an average molecular weight of from about 400 to 25,000. Preferably the diene prepolymer has an average active hydrogen functionality of from about 2 to 3 and an average molecular weight of from about 1,000 to 5,000. Suitable examples include hydroxy, carboxy, thiol and amine functional diene polymers. The preferred active hydrogen functional, long-chain diene prepolymer is a hydroxy terminated polybutadiene having an average active hydrogen functionality between about 2.4 and 2.6 and a molecular weight of about 2800, which is commercially available from Atochem Inc. under the trade designation "Polybd R-45HT".

The polyisocyanate useful in the present invention should have an average isocyanate functionality of from about 2 to 4, preferably from about 2 to 2.3, and may be aliphatic, cycloaliphatic, araliphatic, aromatic, heterocyclic or mixtures thereof. Suitable examples include 1,6-hexamethylene diisocyanate; 1,4-cyclohexane diisocyanate, tolylene diisocyanate, p-phenylene diisocyanate, diphenylmethane diisocyanate, naphthylene-1,5-diisocyanate and mixtures thereof. The polyisocyanate should be present in an amount sufficient to react with all of the active hydrogen atoms in the polymerizable mixture.

The crosslinking initiator useful in the present invention may be any free radical initiator. Preferred crosslinking initiators are the organic peroxides. Suitable examples of organic peroxide initiators include t-butyl peroxyisobutyrate, benzoyl peroxide, p-chlorobenzoyl peroxide, hydroxyheptyl peroxide, cyclohexanone peroxide, di-t-butyl diperphthalate, t-butyl peracetate, t-butyl perbenzoate, dicumyl peroxide, t-butyl hydroperoxide, methyl ethyl ketone, di-t-butyl peroxide, p-methane hydroperoxide, pinane hydroperoxide, cumene hydroperoxide, t-butyl peroxy-2-ethyl hexanoate, 1,1-bis-(t-butylperoxy)-3,3,5-trimethyl-cyclohexane, 2,5-dimethyl-2,5-di(t-butylperoxy)hexane and 2,5-dimethyl-2,5-dihydroperoxide. The crosslinking initiator should be present in an amount sufficient to provide from about 0.1 to 10.0 percent, preferably from about 1.0 to 5.0 percent of the total weight of the reactive components of the polymerizable mixture.

In addition to the components specified above, it is preferred that the polymerizable mixture also contain long-chain, active hydrogen functional, saturated prepolymer having an average active hydrogen functionality of from about 2 to 8, preferably from about 2 to 4, and an average molecular weight of from about 500 to 10,000, preferably from about 500 to 4,000. Suitable long-chain saturated prepolymers include hydroxyl, carboxyl, thiol or amine terminated polyesters, polyethers, polyacetals, polylactones, polydimethylsiloxanes and mixtures thereof. The preferred long-chain, active hydrogen functional, saturated prepolymers are amine and hydroxy terminated polytetramethylene ethers having an average active hydrogen functionality of 2 and an average molecular weight of about 1250 and 2000, respectively, which are commercially available from Polaroid Corporation under the trade designation "Polamine 1000" and QO Chemicals, Inc. under the trade designation "Polymeg 2000", respectively.

The short-chain monomer, long-chain diene prepolymer and the long-chain saturated prepolymer are present in the polymerizable mixture in such relative amounts as will produce a polyurethane having a glass transition temperature greater than about 10° C. and a glass transition temperature range greater than about 70° C. Preferably the short-chain monomer is present in an amount sufficient to provide from 50 to 85 percent of the total, nonaqueous, active hydrogen functional sites in the polymerizable mixture; and the two long-chain prepolymers taken together provide the remaining 15 to 50 percent of the nonaqueous, active hydrogen functional sites. Additionally, it is preferred that the long-chain diene prepolymer is present in an amount sufficient to provide 50 to 80 percent of the total, nonaqueous, active hydrogen functional sites provided by the two prepolymers.

The polymerization reaction which forms the crosslinked polyurethane binder of the invention can be conducted in two stages. The first stage, in which the polyurethane is formed, can be conducted at a broad range of temperatures, usually from about 20° C. to about 125° C. The choice of temperature will, of course, depend upon the rate at which it is desired to conduct the conversion and the physical characteristics of the reactants. Preferably, the urethane forming reaction is carried out at temperatures ranging from about 50° C. to 100° C. At these temperatures, it is frequently desirable, although not essential, to include a urethane catalyst in the polymerizable mixture. Any of the catalysts conventionally employed in the art to catalyze the reaction of an isocyanate with a reactive hydrogen containing compound are suitable for this purpose. A detailed listing of such catalysts may be found, for example, in U.S. Pat. No. 4,202,957.

The second stage, in which crosslinking of the polyurethane soft segments occurs, likewise can be conducted at a broad range of temperatures. The temperature chosen being dependent upon the desired rate of crosslinking, the decomposition rates of the crosslinking initiator and the thermal degradability of the polyurethane. When peroxide crosslinking initiators are used, the crosslinking reaction is preferably conducted at temperatures ranging from about 100° C. to 120° C.

Optionally, foaming agents, lubricants, plasticizers, diluents, fillers, reinforcing fibers, coloring agents and process aids may be added to the polymerizable mixture as desired. Useful foaming agents include water and volatile halogenated hydrocarbon liquids commercially available under the trade designation "FREON". Useful process aids include titanate coupling and dispersing agents which aid the dispersion of the abrasive particles throughout the polymerizable mixture, and silicone surfactants which provide cell structure control and uniformity in foamed articles.

The abrasive particles employed to produce the abrasive articles of the present invention may be of any known abrasive material commonly used in the abrasive art. Examples of suitable abrasive materials include particles of silicon carbide, aluminum oxide, garnet, pumice, sand, emery, mica, corundum, quartz, diamond, boron carbide, fused alumina, sintered alumina, alpha alumina based ceramic material (available from Minnesota Mining and Manufacturing Company under the trade designation "Cubitron") and mixtures thereof. The preferred abrasive materials for wood-working applications are garnet and aluminum oxide particles of from 24 to 400 grade (average particle size of from 0.710 mm to 0.038 mm). The preferred abrasive materials for metal-working applications are silicon carbide and aluminum oxide particles of from 24 to 400 grade (average particle size of from 0.710 mm to 0.038 mm). It is well within the skill in the art to select the appropriate abrasive particle size and type according to the article's particular application or intended use. Furthermore, the abrasive particles should be present in an amount sufficient to provide a weight ratio of abrasive particles to binder in the range from about 0.5:1 to 5.5:1, preferably in the range from about 2:1 to 4:1.

The invention is further illustrated by the following nonlimiting examples wherein all parts are by weight unless otherwise specified.

EXAMPLES 1–8 AND CONTROL EXAMPLES A–D

Examples 1–8 and Control Examples A–D are foamed abrasive wheels having an inside diameter of 50 mm and an outside diameter of 150 mm and designed primarily for wood-working applications. All of these wheels were formed using the same basic procedure, as detailed below for Example 1, with the only changes being in the formulations and components used therein and the conditions used in curing the polyurethane binder. The weight percents of the actual components used in each of these wheels are specified in Table 1. Additionally, Table 1 specifies the percentage of the total, nonaqueous, active hydrogen functional sites in the polymerizable mixture provided by each component, the conditions used to cure the binder, and the density and thickness of the wheels produced.

The wheel of Example 1 was prepared by first melting a polytetramethylene ether glycol having an average active hydrogen functionality of 2 and an average molecular weight of about 2000 (commercially available from QO Chemicals, Inc. under the trade designation "Polymeg 2000") (long-chain saturated prepolymer) until fluid, in an oven heated to 50° C. Next a polymerizable solvent-free liquid mixture was formed by combining, in a batch container, the following ingredients: (a) the melted polytetramethylene ether glycol; (b) a hydroxy terminated polybutadiene having an average active hydrogen functionality between about 2.4 and 2.6 and an average molecular weight of about 2800 (commercially available from Atochem, Inc. under the trade designation "Polybd R-45HT") (long-chain diene prepolymer); (c) 1,4-butanediol (short-chain monomer); (d) diethyltoluene diamine (short-chain monomer); (e) water (foaming agent); (f) t-butyl peroxy-2-ethyl hexanoate (commercially available from Lucidol Penwalt under the trade designation "Lupersol PDO") (crosslinking initiator); (g) tetra (2,2 diallyoxymethyl)butyl, di(ditridecyl)phosphito titanate (commercially available from Kenrich Petrochemicals, Inc. under the trade designation "KR-55") (titanate coupling and dispersing agent); (h) mixed $C_7$, $C_9$ and $C_{11}$ dialkyl phthalate (commercially available from Chem Central/Minnesota under the trade designation "Palatinol 711-P") (plasticizer and viscosity reducer); (i) silicone surfactant (commercially available from Union Carbide Corporation under the trade designation "L-562"); and (j) a blend of an organic salt of a tertiary amine and an organometallic compound in organic solvents in a 3 to 1 ratio (commercially available from Air Products and Chemicals, Inc. under the trade designations "Dabco DC-1" and "Dabco DC-2") (urethane catalysts). These components were well mixed and then a 4,4-diphenylmethane diisocyanate (commercially available from Dow Chemical Company under the trade designation "Isonate 143L") (polyisocyanate) was added and dispersed throughout the mixture. To this reactive polymerizable mixture was added 60 grade (average particle size of 0.25 mm) garnet abrasive particles which were dispersed homogeneously throughout. The resulting reactive abrasive particle slurry was then poured into a 65° C. open steel mold so as to partially fill the mold, and the mold was capped and placed into a 65° C. hydraulic press to maintain a closed mold during the reactive foaming of the polyurethane system. After 20 minutes the partially cured molded abrasive article was removed from the mold and placed in an oven heated to 110° C. for one hour. The resultant foamed molded abrasive wheel was 50 mm thick, and had an inside diameter of 50 mm and an outside diameter of 150 mm.

TABLE 1

| Components | Example 1 % Active Hydrogen | Example 1 Wt. % | Example 2 % Active Hydrogen | Example 2 Wt. % | Example 3 % Active Hydrogen | Example 3 Wt. % | Example 4 % Active Hydrogen | Example 4 Wt. % | Example 5 % Active Hydrogen | Example 5 Wt. % | Example 6 % Active Hydrogen | Example 6 Wt. % |
|---|---|---|---|---|---|---|---|---|---|---|---|---|
| Polymeg 2000[1] | 6.4 | 2.89 | 10.5 | 4.70 | | | | | 5.6 | 2.70 | 7.2 | 3.04 |
| PPG 2025[2] | | | | | | | | | | | | |
| PCP-0240[3] | | | | | | | | | | | | |
| Polybd R-45 HT[4] | 17.6 | 9.32 | 10.5 | 5.73 | 30.0 | 14.05 | 30.0 | 14.05 | 15.4 | 8.73 | 19.8 | 9.83 |
| 1,4 Butanediol | 72.0 | 1.46 | 73.0 | 1.47 | 64.0 | 1.13 | 70.0 | 1.24 | 75.0 | 1.63 | 69.0 | 1.31 |
| LG-650[5] | | | | | | | | | | | | |
| Trimethylolpropane | | | 6.0 | 0.12 | 6.0 | 0.11 | | | | | | |
| Diethyltoluene diamine | 4.0 | 0.16 | | | | | | | 4.0 | 0.17 | 4.0 | 0.15 |
| Water | | 0.06 | | 0.11 | | 0.11 | | 0.11 | | 0.07 | | 0.06 |
| Isonate 143L[6] | | 8.31 | | 8.50 | | 7.78 | | 7.78 | | 8.90 | | 7.81 |
| Lupersol PDO[7] | | 0.78 | | | | 0.82 | | 0.82 | | 0.78 | | 0.78 |
| Lupersol 101[8] | | | | 0.12 | | | | | | | | |
| Lupersol 231[9] | | | | | | | | | | | | |
| KR-55[10] | | 0.17 | | | | 0.15 | | 0.15 | | 0.17 | | 0.17 |
| L-562[11] | | 0.44 | | | | | | | | 0.44 | | 0.44 |
| Dabco DC1/DC2[12] (3:1 ratio) | | 0.02 | | | | | | | | 0.02 | | 0.02 |
| Palatinol 711-P[13] | | 1.39 | | 1.65 | | 1.44 | | 1.44 | | 1.39 | | 1.39 |
| Dibutyl Tin Dilaurate[14] | | | | 0.01 | | 0.01 | | 0.01 | | | | |
| Garnet Mineral (60 grade/0.25 mm) | | 75.00 | | 77.59 | | 74.40 | | 74.40 | | 75.00 | | 75.00 |
| Density (g/cm$^3$) | | 1.28 | | 1.39 | | 1.28 | | 1.24 | | 1.26 | | 1.27 |
| Wheel Thickness (mm) | | 50 | | 25 | | 25 | | 25 | | 50 | | 50 |
| Mold Cure Time (min)/Temp (°C.) | | 20/65 | | 30/100 | | 20/100 | | 20/100 | | 20/65 | | 20/65 |
| Oven Cure Time (min)/Temp (°C.) | | 60/110 | | 60/150 | | 60/110 | | 60/110 | | 60/110 | | 60/110 |

| Components | Example 7 % Active Hydrogen | Example 7 Wt. % | Example 8 % Active Hydrogen | Example 8 Wt. % | Control A % Active Hydrogen | Control A Wt. % | Control B % Active Hydrogen | Control B Wt. % | Control C % Active Hydrogen | Control C Wt. % | Control D % Active Hydrogen | Control D Wt. % |
|---|---|---|---|---|---|---|---|---|---|---|---|---|
| Polymeg 2000[1] | 8.0 | 3.19 | 8.0 | 3.23 | | | 25.0 | 12.02 | 21.0 | 10.73 | | |
| PPG 2025[2] | | | | | 25.0 | 12.02 | | | | | | |
| PCP-0240[3] | | | | | | | | | | | 21.0 | 10.14 |
| Polybd R-45 HT[4] | 22.0 | 10.29 | 22.0 | 10.43 | | | | | | | | |
| 1,4 Butanediol | 66.0 | 1.18 | 64.0 | 1.16 | 35.0 | 0.75 | 35.0 | 0.75 | 74.0 | 1.71 | 74.0 | 1.61 |
| LG-650[5] | | | | | 40.0 | 1.66 | 40.0 | 1.66 | | | | |
| Trimethylol- | | | 6.0 | 0.11 | | | | | 5.0 | 0.12 | 5.0 | 0.11 |

TABLE 1-continued

| propane | | | | | | |
|---|---|---|---|---|---|---|
| Diethyltoluene | 4.0 | 0.14 | | | | |
| diamine | | | | | | |
| Water | | 0.06 | 0.10 | 0.03 | 0.03 | 0.12 | 0.11 |
| Isonate 143L[6] | | 7.34 | 7.88 | 7.30 | 7.30 | 9.65 | 9.12 |
| Lupersol PDO[7] | 0.78 | | | | | |
| Lupersol 101[8] | | | | | | |
| Lupersol 231[9] | | 0.31 | | | | |
| KR-55[10] | 0.17 | | | | | |
| L-562[11] | 0.44 | | | | | |
| Dabco DC1/DC2[12] | 0.02 | | | | | |
| (3:1 ratio) | | | | | | |
| Palatinol 711-P[13] | 1.39 | 1.82 | | | | 1.22 |
| Dibutyl Tin | | 0.01 | 0.01 | 0.01 | 0.01 | 0.01 |
| Dilaurate[14] | | | | | | |
| Garnet Mineral | 75.00 | 74.95 | 78.23 | 78.23 | 77.66 | 77.68 |
| (60 grade/0.25 mm) | | | | | | |
| Density (g/cm$^3$) | 1.30 | 1.24 | 1.37 | 1.39 | 1.30 | 1.26 |
| Wheel Thickness (mm) | 50 | 25 | 25 | 25 | 25 | 25 |
| Mold Cure | 20/65 | 20/100 | 20/100 | 20/100 | 20/100 | 20/100 |
| Time (min)/Temp (°C.) | | | | | | |
| Oven Cure | 60/110 | 50/140 | 120/100 | 120/100 | 180/100 | 180/100 |
| Time (min)/Temp (°C.) | | | | | | |

[1]Polymeg 2000 - a polytetramethylene ether glycol having an average active hydrogen functionality of 2 and an average molecular weight of about 2000 that is commercially available from QO Chemicals, Inc. (long-chain saturated prepolymer).
[2]PPG 2025 - a polypropyleneoxide diol having a molecular weight of about 2000 that is commercially available from Union Carbide Corporation (long-chain saturated prepolymer).
[3]PCP-0240 - a polycaprolactone diol having a molecular weight of about 2000 that is commercially available from Union Carbide Corporation (long-chain saturated prepolymer).
[4]Polybd R-45 HT - a hydroxy terminated polybutadiene having an average active hydrogen functionality between about 2.4 and 2.6 and an average molecular weight of about 2800 that is commercially available from Atochem, Inc. (long-chain diene prepolymer).
[5]LG-650 - a polypropyleneoxide triol having a molecular weight of about 100 that is commercially available from Union Carbide Corporation (short-chain monomer).
[6]Isonate 143L - 4,4-diphenylmethane diisocyanate commercially available from Dow Chemical Company (polyisocyanate).
[7]Lupersol PDO - t-butyl peroxy-2-ethyl hexanoate commercially available from Lucidol Penwalt (crosslinking initiator).
[8]Lupersol 101 - 2,5-dimethyl-2,5-di(t-butylperoxy)hexane commercially available from Lucidol Penwalt (crosslinking initiator).
[9]Lupersol 231 - 1,1-bis-(t-butyl peroxy)-3,3,5-trimethyl-cyclohexane commercially available from Lucidol Perwalt (crosslinking initiator).
[10]KR-55 - tetra(2,2 diallyoxymethyl) butyl, di(ditridecyl) phosphito titanate commercially available from Kenrich Petrochemicals, Inc. (titanate coupling and dispersing agent).
[11]L-562 - silicone surfactant commercially available from Union Carbide Corporation.
[12]Dabco DC1/DC2 - a blend of an organic salt of a tertiary amine and an organometallic compound in organic solvents in a 3 to 1 ratio commercially available from Air Products and Chemicals, Inc. (urethane catalysts).
[13]Palatinol 711-P - mixed $C_7$, $C_9$ and $C_{11}$ dialkyl phthalate commercially available from Chem Central/Minnesota (plasticizer and viscosity reducer).
[14]Dibutyl Tin Dilaurate - organo metallic tin catalyst for urethane polymerization.

The wheels of Examples 1-8 and Control Examples A-D were evaluated for product cut and wheel wear (the amount of material worn from the workpiece and wheel respectively) when used for sanding wood. The wheels were prepared by first dressing the working surface with a diamond tool to remove the urethane surface skin. The remaining resin on the wheel surface was removed by running the wheel under high pressure against an oak block. This exposed the mineral and generated a working surface.

In this test pre-weighed wheels were mounted on the arbor of a mechanically driven, variable speed lathe having the revolutions per minute of the arbor adjusted to generate a test speed of 810 surface meters per minute at the outer surface of the revolving wheel. A carriage containing six, pre-weighed oak blocks 80 mm long by 30 mm wide by 13 mm thick was brought against the rotating wheel, such that the wheel contacted the 13 mm by 80 mm surface, at a force of 1310 N/m. The carriage was oscillated up and down with a stroke length of 140 mm and a stroke speed of 130 mm/s. Contact between the rotating wheel and oak blocks was maintained for 1 minute, after which time the test was stopped and the weight loss of the wheel and blocks was determined. Table 2 shows the results of this test for Examples 1-8 and Controls Examples A-D. The cut and wear data have been standardized by dividing the rates of cut and wear by the thickness of the wheel.

TABLE 2

| Wheel Identification | Cut (g/min)/cm | Wear (g/min)/cm | Efficiency (cut wear) |
|---|---|---|---|
| Example 1 | 1.2 | 0.7 | 1.76 |
| Control A @ | 3.9 | 42.2 | 0.09 |
| Control B @ | 3.5 | 42.4 | 0.08 |
| Control C* | 0.6 | 0.4 | 1.45 |
| Control D* | 0.9 | 1.0 | 0.93 |
| Example 2 | 3.0 | 1.9 | 1.57 |
| Example 3 | 1.8 | 5.0 | 0.36 |
| Example 4 | 1.9 | 3.1 | 0.59 |
| Example 5 | 1.3 | 0.9 | 2.45 |
| Example 6 | 1.1 | 1.0 | 1.04 |
| Example 7 | 1.6 | 3.1 | 0.52 |
| Example 8 | 3.2 | 5.1 | 0.64 |
| Comparable Competitive # Product | 1.9 | 3.1 | 0.63 |

@ High wheel wear
*Resin melted on wheel surface reducing product cut.
Polybond, 60 grit, Type 20, Wheel commercially available from Norton under the trade designation "Carbo-Cut".

As shown in Table 2, the cut and wear values for the wheels of Examples 1-8 demonstrate that crosslinking through the vinyl unsaturation in the polyurethane soft segment provides flexible wheels having high amounts of cut, low amounts of wheel wear and no smearing or glazing. In contrast, the wheels of Control Examples A and B, having a substantial amount of conventional crosslinking in the urethane hard segment by the use of a trifunctional polyol, had high amounts of cut but at excessively high amounts of wheel wear. Additionally, the wheels of Control Examples C and D, having a minor amount of conventional crosslinking in the polyurethane hard segment by the use of a trifunctional polyol, had low amounts of wheel wear but had unacceptably low amounts of cut because the binder resin melted on the wheel surface forming a glaze.

The broad range of cut values for the wheels of Examples 1-8 indicate wheels suitable for different applications. For example, a high cutting rate wheel, like the wheel of Example 2, may be used to remove large amounts of stock on hard woods such as oak or maple, whereas, a lower cutting rate wheel, like the wheel of Example 6, may be used for light sanding on soft woods such as pine.

EXAMPLES 9-14 AND CONTROL EXAMPLES E-H

Examples 9-14 and Control Examples E-H are solid abrasive wheels designed primarily for metal-working applications. These wheels are 25 mm thick and have an inside diameter of 32 mm and an outside diameter of either 150 mm or 200 mm. These wheels were prepared in a manner similar to that detailed for Example 1 with the following exceptions: the molds were completely filled with the reactive abrasive particle slurry, water was omitted from the formulation, butyl stearate was substituted for Palatinol 711-P and silicon carbide particles were substituted for the garnet abrasive particles. The formulations, curing conditions and outside diameter for the wheels of Examples 9-14 and Control Examples E-H are shown in Table 3.

TABLE 3

| | Example 9 | | Example 10 | | Example 11 | | Example 12 | | Example 13 | | Example 14 | |
|---|---|---|---|---|---|---|---|---|---|---|---|---|
| Components | % Active Hydrogen | Wt. % | % Active Hydrogen | Wt. % | % Active Hydrogen | Wt. % | % Active Hydrogen | Wt. % | % Active Hydrogen | Wt. % | % Active Hydrogen | Wt. % |
| Polymeg 2000 | 10.0 | 5.18 | | | 6.7 | 4.29 | 8.0 | 3.65 | 8.0 | 3.60 | | |
| Polamine 1000[1] | | | | | | | | | | | 14.0 | 4.77 |
| Polybd R-45 HT | 20.0 | 12.17 | 25.0 | 18.34 | 18.3 | 13.76 | 22.0 | 13.91 | 22.0 | 13.72 | 14.0 | 9.40 |
| 1,4 Butanediol | 64.0 | 1.49 | 75.0 | 2.10 | 75.0 | 2.16 | 70.0 | 1.43 | 60.0 | 1.21 | 72.0 | 1.85 |
| Diethyltoluene diamine | 6.0 | 0.28 | | | | | | | 10.0 | 0.40 | | |
| Isonate 143L | | 7.86 | | 9.49 | | 9.72 | | 6.81 | | 6.82 | | 9.04 |
| Lupersol 231 | | | | 0.70 | | 0.70 | | 0.39 | | | | |
| Lupersol PDO | | 0.81 | | | | | | | | 0.77 | | 1.00 |
| KR-55 | | 0.27 | | 0.30 | | 0.30 | | | | 0.19 | | 0.25 |
| L-562 | | | | | | | | | | | | 0.25 |
| L-5421[2] | | | | | | | | 0.28 | | 0.19 | | |
| Butyl Stearate[3] | | 2.70 | | 2.39 | | 2.39 | | 2.10 | | 1.67 | | 2.00 |
| Dibutyl Tin Dilaurate | | 0.01 | | 0.01 | | 0.01 | | 0.01 | | 0.01 | | |
| LICA 38[4] | | | | | | | | | | | | |
| Silicon Carbide (60 grade/0.25 mm) | | 69.23 | | 66.67 | | 66.67 | | 71.42 | | 71.42 | | 71.44 |
| Density (g/cm$^3$) | | 1.75 | | 1.57 | | 1.76 | | 1.60 | | 1.82 | | 1.80 |
| Wheel Diameter (mm) | | 200 | | 150 | | 150 | | 150 | | 150 | | 200 |
| Mold Cure | | | | | | | | | | | | |
| Time (min)/Temp (°C.) | | 20/100 | | 20/100 | | 20/100 | | 15/100 | | 15/100 | | 10/80 |
| Oven Cure | | | | | | | | | | | | |
| Time (min)/Temp (°C.) | | 60/110 | | 60/135 | | 60/135 | | 90/120 | | 90/120 | | 90/110 |

| | Example 15 | | Control E | | Control F | | Control G | | Control H | |
|---|---|---|---|---|---|---|---|---|---|---|
| Components | % Active Hydrogen | Wt. % | % Active Hydrogen | Wt. % | % Active Hydrogen | Wt. % | % Active Hydrogen | Wt. % | % Active Hydrogen | Wt. % |
| Polymeg 2000 | | | 25.0 | 17.55 | 25.0 | 17.18 | | | 6.7 | 4.38 |
| Polamine 1000[1] | 10.0 | 3.46 | | | | | | | | |
| Polybd R-45 HT | 15.0 | 10.22 | | | | | 25.0 | 18.73 | 18.3 | 14.05 |
| 1,4 Butanediol | 70.0 | 1.82 | 75.0 | 2.36 | 75.0 | 2.32 | 75.0 | 2.15 | 75.0 | 2.20 |
| Diethyltoluene diamine | 5.0 | 0.26 | | | | | | | | |
| Isonate 143L | | 9.16 | | 10.65 | | 10.43 | | 9.68 | | 9.93 |
| Lupersol 231 | | | | | | 0.70 | | | | |
| Lupersol PDO | | 1.00 | | | | | | | | |
| KR-55 | | 0.37 | | 0.31 | | 0.30 | | 0.31 | | 0.31 |
| L-562 | | 0.25 | | | | | | | | |
| L-5421[2] | | | | | | | | | | |
| Butyl Stearate[3] | | 2.00 | | 2.45 | | 2.39 | | 2.45 | | 2.45 |
| Dibutyl Tin Dilaurate | | | | 0.01 | | 0.01 | | 0.01 | | 0.01 |
| LICA 38[4] | | 0.01 | | | | | | | | |
| Silicon Carbide (60 grade/02.5 mm) | | 71.45 | | 66.67 | | 66.67 | | 66.67 | | 66.67 |
| Density (g/cm$^3$) | | 1.77 | | 1.60 | | 1.67 | | 1.78 | | 1.76 |
| Wheel Diameter (mm) | | 200 | | 150 | | 150 | | 150 | | 150 |
| Mold Cure | | | | | | | | | | |
| Time (min)/Temp (°C.) | | 15/80 | | 20/100 | | 20/100 | | 20/100 | | 20/100 |
| Oven Cure | | | | | | | | | | |

TABLE 3-continued

| Time (min)/Temp (°C.) | 90/110 | 60/135 | 60/135 | 60/135 | 60/135 |
|---|---|---|---|---|---|

[1] Polamine 1000 - an amine terminated polytetramethylene ether having an average active hydrogen functionality of 2 and an average molecular weight of about 1250 that is commercially available from Polaroid Corporation (long-chain saturated prepolymer).
[2] L-5421 - silicone surfactant commercially available from Union Carbide Corporation.
[3] Butyl Stearate - Lubricant and viscosity reducer.
[4] LICA 38 - titanate coupling and dispersing agent commercially available from Kenrich Petrochemicals, Inc.

Examples 9-15 and Control Examples E-H were evaluated for product cut and wheel wear (the amount of material worn from the workpiece and wheel, respectively) when used on metal test panels. The wheels were prepared by first dressing the working surface with a diamond tool to remove the urethane surface skin. The remaining resin on the wheel surface was removed by running the Wheel under high pressure against an oak block. This exposed the mineral and generated a working surface.

In this test pre-weighed wheels were mounted on the arbor of a mechanically driven, variable speed lathe and the revolutions per minute of the arbor were adjusted to provide a test surface speed of 955 surface meters per minute at the outer surface of the revolving wheel. A carriage containing a metal test panel (50 mm by 280 mm, 16 ga. 1008 CRS perforated screen, 4 mm diameter, staggered holes, 46% open, stock pattern #401, commercially available from Harrington & King Perforating Company, Inc., Chicago, Ill.) was brought against the rotating wheel at a force of 2625 N/m. The carriage was oscillated up and down with a stroke length of 140 mm and a stroke speed of 130 mm/s. Contact between the rotating wheel and the metal test panel was maintained for 1 minute, after which time the test was stopped and the weight loss of the wheel and the test panel was determined. Table 5 shows the results of this test for Examples 9-15 and Control Examples E-H. Wheel wear was measured as the percentage of the wheel weight worn away per minute. Additionally, the cut and wheel wear data have been standardized by dividing the measured rates of cut and wear by the thickness of the wheel.

Additionally, 10 mm thick wheels having an inside diameter of 6 mm and an outside diameter of 75 mm, prepared with formulations and procedures identical to those used in Examples 9-11, 13, 14 and 15, and Control Examples E-H, were evaluated for smearing or transfer of materials from the wheel to a test work-piece. The wheels were mounted on the arbor of an electrically powered tool which was rotated at 7,500 revolutions per minute. The tool was solidly supported and loaded with a 3.6 kg weight to force the wheel against the work-piece. The rotating wheel was forced against a 60 mm × 300 mm titanium metal plate which was mounted on a traversing table that moved, causing the wheel to make a 200 mm long path on the metal plate at the rate of 25 mm per second. The amount of material transferred from the wheel to the work-piece was observed and rated according to the scale given in Table 4.

TABLE 4

| Rating | |
|---|---|
| 1 | No transfer |
| 2 | Very slight transfer |
| 5 | Significant and objectionable transfer |
| 8 | Large amounts of transfer |
| 10 | Gross amounts of transfer |

The results of the smear test described above, and the wheel cut and wear tests for Examples 9-15 and Control Examples E-H are shown in Table 5.

TABLE 5

| Identification | Cut (g/min)/cm | Wear (% wear/min)/cm | Efficiency (cut/wear) | Transfer Rating |
|---|---|---|---|---|
| Example 9 | 0.4 | 0.03 | 13.9 | 1 |
| Example 10 | 1.4 | 0.24 | 5.9 | 2 |
| Example 11 | 1.3 | 0.20 | 6.2 | 3 |
| Example 12 | 2.6 | 2.24 | 1.2 | — |
| Example 13 | 1.3 | 0.20 | 6.7 | 1 |
| Example 14 | 1.5 | 0.03 | 45.1 | 2 |
| Example 15 | 4.5 | 0.11 | 41.9 | 2 |
| Control E | 0.7 | 0.14 | 5.1 | 10 |
| Control F | 1.2 | 0.39 | 3.2 | 5 |
| Control G | 0.9 | 0.24 | 3.6 | 9 |
| Control H | 0.7 | 0.12 | 5.9 | 10 |
| Comparable Competitive # Product | 0.9 | 0.30 | 3.1 | 5 |

Product #616-C, commercially available from Cratex Manufacturing Company, Inc., 518 Stone Rd., Benicia, CA As shown in Table 5, the cut and transfer rating values for the wheels of Examples 9-15 demonstrate that crosslinking through the vinyl unsaturation in the polyurethane soft segment provides wheels displaying a wide range of cut values with very little or no smearing on the surface of the workpiece. In contrast, the wheels of Control Examples E-H having uncrosslinked polyurethane soft segments, although exhibiting a fairly broad range of cut values, all produce unacceptable amounts of smear on the workpiece.

The broad range of cut values for the wheels of Examples 9-15 indicate wheels suitable for different applications. For example, a low cutting rate wheel, like the wheel of Example 9, may be used for light deburring in the jewelry industry where low rates of cut are desirable, whereas a higher cutting rate wheel, like the wheel of Example 15, may be used for heavy deburring of forged parts where high rates of cut are desirable.

The wheel of Example 15, and films (Examples 16-22) of cured binder resin compositions prepared according to the formulations given in Tables 1 and 3 for Examples 8, 10 and 11 and Control Examples E-H, with the exception that the water, Palatinol 711-P, butyl stearate and abrasive mineral were omitted, were evaluated for glass transition temperature ($T_g$), glass transition temperature range ($\Delta T_g$), tensile strength and elongation at break.

EXAMPLES 16-22

The films of Examples 16-22 were formed by first preparing a reactive liquid mixture of the various components according to the procedure detailed for Example 1, modified as necessary to accommodate the omission of the components listed above. A sufficient amount of the reactive mixture was then poured onto a release-agent coated galvanized metal sheet to produce a 3 mm thick cured film. The release-agent coated galvanized metal sheet was prepared by coating the galvanized metal sheet with an aqueous solution of polyvinyl alcohol and allowing the coating to air dry. All of the binder resin films were then cured in an oven heated to 100° C. for 60 minutes. The films of Examples 17, 18, and 20 were further cured in an oven heated to 135° C. for 60 minutes. The cured polymer films were then removed from the oven and allowed to cool.

The glass transition temperature and glass transition temperature range for the wheel of Example 15 and the films of Examples 16–22 were measured by Dynamic Mechanical Analysis according to the method described in ASTM D 4065-83. The glass transition temperature recorded is the temperature at which a maximum value of the ratio of lost to stored energies (Tan δ) occurs during transition to the elastomeric state, and the glass transition temperature range recorded is the temperature range over which the Tensile Storage Modulus transcended from a maximum to a minimum.

Additionally, tensile strength and elongation at break were measured for some of these films per ASTM D 412-80. The formulations for these Examples and the results of these tests are shown in Table 6.

TABLE 6

| Components | Example 15 % Active Hydrogen | Wt. % | Example 16 % Active Hydrogen | Wt. % | Example 17 % Active Hydrogen | Wt. % | Example 18 % Active Hydrogen | Wt. % |
|---|---|---|---|---|---|---|---|---|
| Polybd R-45HT | 15.0 | 10.22 | 22.0 | 48.73 | 25.0 | 60.26 | 18.3 | 45.30 |
| Polymeg 2000 | | | 8.0 | 15.14 | | | 6.7 | 13.95 |
| Polamine 1000 | 10.0 | 3.46 | | | | | | |
| 1,4 Butanediol | 70.0 | 1.82 | 64.0 | 5.47 | 75.0 | 6.84 | 75.0 | 7.02 |
| Trimethylolpropane | | | 6.0 | 0.50 | | | | |
| Diethyltoluene diamine | 5.0 | 0.26 | | | | | | |
| Water | | | | | | | | |
| Isonate 143L | | 9.16 | | 28.65 | | 30.78 | | 31.61 |
| Lupersol PDO | | 1.00 | | | | | | |
| Lupersol 231 | | | | 1.46 | | 2.09 | | 2.09 |
| KR-55 | | 0.37 | | | | | | |
| L-562 | | 0.25 | | | | | | |
| LICA 38 | | 0.01 | | | | | | |
| Dibutyl Tin Dilaurate | | | | 0.05 | | 0.03 | | 0.03 |
| Palatinol 711-P | | | | | | | | |
| Butyl Stearate | | 2.00 | | | | | | |
| Garnet (60 grade) | | | | | | | | |
| Silicon Carbide (60 grade) | | 71.45 | | | | | | |
| Corresponding Wheel Example | | | Example 8 | | Example 9 | | Example 10 | |
| $T_g$(°C.) | | 96 | | 20 | | 10 | | 70 |
| $\Delta T_g$ (°C. for Complete Transition) | | 175 | | 90 | | 70 | | 130 |
| Tensile (MPa) | | — | | — | | 27.0 | | 10.5 |
| Elongation (%) | | — | | — | | 45 | | 78 |

| Components | Example 19 % Active Hydrogen | Wt. % | Example 20 % Active Hydrogen | Wt. % | Example 21 % Active Hydrogen | Wt. % | Example 22 % Active Hydrogen | Wt. % |
|---|---|---|---|---|---|---|---|---|
| Polybd R-45HT | | | | | 25.0 | 61.55 | 18.3 | 46.27 |
| Polymeg 2000 | 25.0 | 57.40 | 25.0 | 56.20 | | | 6.7 | 14.25 |
| Polamine 1000 | | | | | | | | |
| 1,4 Butanediol | 75.0 | 7.73 | 75.0 | 7.57 | 75.0 | 6.98 | 75.0 | 7.17 |
| Trimethylolpropane | | | | | | | | |
| Diethyltoluene diamine | | | | | | | | |
| Water | | | | | | | | |
| Isonate 143L | | 34.84 | | 34.11 | | 31.44 | | 32.28 |
| Lupersol PDO | | | | | | | | |
| Lupersol 231 | | | | 2.09 | | | | |
| KR-55 | | | | | | | | |
| L-562 | | | | | | | | |
| LICA 38 | | | | | | | | |
| Dibutyl Tin Dilaurate | | 0.03 | | 0.03 | | 0.03 | | 0.03 |
| Palatinol 711-P | | | | | | | | |
| Butyl Stearate | | | | | | | | |
| Garnet (60 grade) | | | | | | | | |
| Silicon Carbide (60 grade) | | | | | | | | |
| Corresponding Wheel Example | Control E | | Control F | | Control G | | Control H | |
| $T_g$(°C.) | −5 | | 0 | | −30 | | −30 | |
| $\Delta T_g$ (°C. for Complete Transition) | 65 | | 80 | | 50 | | 45 | |
| Tensile (MPa) | 28.8 | | 26.4 | | 11.6 | | 13.7 | |

TABLE 6-continued

| Elongation (%) | 384 | 446 | 153 | 145 |
|---|---|---|---|---|

As shown In Table 6, the glass transition temperature values demonstrate that crosslinking through the vinyl unsaturation in the polyurethane soft segment provides a polyurethane binder matrix having a glass transition temperature greater than about 10° C. and a glass transition temperature range of greater than about 70° C.

What is claimed is:

1. A molded abrasive article comprising:
   (a) a smear-resistant, elastomeric, crosslinked polyurethane binder matrix comprised of the polymerization reaction product of a solvent-free polymerizable mixture comprising:
      (i) short-chain, active hydrogen functional monomer having an average active hydrogen functionality of from about 2 to 8 and an average molecular weight less than about 400,
      (ii) long-chain, active hydrogen functional, diene prepolymer having an average active hydrogen functionality of from about 2 to 4 and an average molecular weight from about 400 to 25,000,
      (iii) polyisocyanate having an average isocyanate functionality of from about 2 to 4, and
      (iv) crosslinking initiator which induces crosslinking between unsaturation sites on adjacent diene prepolymer residues,
   said reaction product having a glass transition temperature of at least about 10° C. and a glass transition temperature range of at least about 70° C. when cured; and
   (b) particles of abrasive material dispersed throughout and adhered within said polyurethane binder matrix.

2. A molded abrasive article as recited in claim 1 wherein said short-chain monomer has an average active hydrogen functionality of from about 2 to 3 and an average molecular weight less than 200.

3. A molded abrasive article as recited in claim 1 wherein said diene prepolymer has an average active hydrogen functionality of from about 2 to 3 and an average molecular weight of from about 1000 to 5000.

4. A molded abrasive article as recited in claim 1 wherein said polyisocyanate has an average isocyanate functionality of from about 2.0 to 2.3.

5. A molded abrasive article as recited in claim 1 wherein said crosslinking initiator is a peroxide free radical initiator.

6. A molded abrasive article as recited in claim 1 wherein said polymerizable mixture further comprises a foaming agent.

7. A molded abrasive article as recited in claim 6 wherein said foaming agent comprises water.

8. A molded abrasive article as recited in claim 1 having a weight ratio of particles of abrasive material to binder matrix in the range of from about 0.5:1 to 5.5:1.

9. A molded abrasive article as recited in claim 8 wherein said weight ratio is in the range of from about 2:1 to 4:1.

10. A molded abrasive article as recited in claim 1 wherein said polymerizable mixture further comprises long-chain, active hydrogen functional, saturated prepolymer having an average active hydrogen functionality of from about 2 to 8 and an average molecular weight from about 500 to 10,000.

11. A molded abrasive article as recited in claim 10 wherein said saturated prepolymer has an average active hydrogen functionality of from about 2 to 4 and an average molecular weight of from about 500 to 4000.

12. A molded abrasive article as recited in claim 1 wherein said polymerizable mixture comprises:
   (i) short chain, active hydrogen functional monomer having an average active hydrogen functionality of from about 2 to 3 and an average molecular weight less than about 200,
   (ii) long-chain active hydrogen functional, diene prepolymer having an average active hydrogen functionality of from about 2 to 3 and an average molecular weight of from about 1000 to 5000,
   (iii) polyisocyanate having an average isocyanate functionality of from about 2.0 to 2.3,
   (iv) peroxide free radical initiator, and
   (v) long-chain, active hydrogen functional, saturated prepolymer having an average active hydrogen functionality of from about 2 to 4 and an average molecular weight of from about 500 to 4000.

13. A molded abrasive article as recited in claim 12 wherein said polymerizable mixture further comprises a foaming agent.

14. A molded abrasive article as recited in claim 13 wherein said foaming agent is water.

15. A molded abrasive article as recited in claim 12 having a density in the range from about 1.2 g/cm$^3$ to 2.5 g/cm$^3$.

16. A molded abrasive article as recited in claim 13 having a density in the range from about 0.5 g/cm$^3$ to 1.5 g/cm$^3$.

17. A molded abrasive article as recited in claim 1 having a binder matrix comprised of the polymerization reaction product of a polymerizable mixture of components containing nonaqueous active hydrogen functional sites wherein said short-chain monomer provides from about 50 to 85 percent of said nonaqueous active hydrogen functional sites.

18. A molded abrasive article as recited in claim 12 having a binder matrix comprised of the polymerization reaction product of a polymerizable mixture of components containing nonaqueous active hydrogen functional sites wherein said short-chain monomer provides from about 50 to 85 percent of said nonaqueous active hydrogen functional sites, said saturated prepolymer and said diene prepolymer taken together provide the remaining 15 to 50 percent of said nonaqueous active hydrogen functional sites, and said diene prepolymer provides about 50 to 80 percent of the nonaqueous active hydrogen functional sites provided by said two prepolymers.

19. A molded abrasive article as recited in claim 18 wherein said diene prepolymer is a polybutadiene having an average active hydrogen functionality of from about 2 to 3 and an average molecular weight of from about 1000 to 5000.

20. A molded abrasive article as recited in claim 19 wherein said saturated prepolymer is a diamine having an average molecular weight of from about 500 to 4000.

21. A molded abrasive article as recited in claim 19 wherein said saturated prepolymer is a diol having an average molecular weight of from about 500 to 4000.

* * * * *